US011075966B2

(12) United States Patent
Bongaarts et al.

(10) Patent No.: US 11,075,966 B2
(45) Date of Patent: Jul. 27, 2021

(54) CACHE AND MULTICAST TECHNIQUES TO REDUCE BANDWIDTH UTILIZATION

(71) Applicant: T-Mobile USA, Inc., Bellevue, WA (US)

(72) Inventors: Paul Bongaarts, Issaquah, WA (US); Aaron Drake, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/653,908

(22) Filed: Oct. 15, 2019

(65) Prior Publication Data

US 2020/0120150 A1  Apr. 16, 2020

Related U.S. Application Data

(60) Provisional application No. 62/746,463, filed on Oct. 16, 2018.

(51) Int. Cl.
*H04L 29/06* (2006.01)
*H04W 4/08* (2009.01)

(52) U.S. Cl.
CPC ...... *H04L 65/4076* (2013.01); *H04L 65/4084* (2013.01); *H04L 65/605* (2013.01); *H04W 4/08* (2013.01)

(58) Field of Classification Search
CPC . H04L 65/4076; H04L 67/02; H04L 65/4084; H04L 65/607; H04L 65/80;
(Continued)

(56) References Cited

U.S. PATENT DOCUMENTS

2004/0172647 A1   9/2004   Godwin
2013/0263190 A1*  10/2013  Aravindakshan ... H04L 12/1886
                                                        725/62
(Continued)

FOREIGN PATENT DOCUMENTS

KR   20160092390 A   8/2016
WO     2017031743 A1   3/2017

OTHER PUBLICATIONS

International Patent Application No. PCT/US2019/056597, International Search Report and Written Opinion, dated Feb. 5, 2020, 11 pages.

*Primary Examiner* — Djenane M Bayard
(74) *Attorney, Agent, or Firm* — Han Santos, PLLC

(57) ABSTRACT

Techniques are described herein for caching content locally at a local network device and serving the cached content via multicast transmission to a user equipment in a multicast single frequency network (SFN) coverage area in which the local network device is located. The local network device receives a request for content from the user equipment in the multicast SFN coverage area. The request includes usage data associated with the user equipment indicating a triggering event. If the content is not cached at the local network device, the local network device identifies a content server to provide the content based at least on the usage data and a broadcast identifier associated with the local network device. The local network device receives the content that is associated with the broadcast identifier of the local network device and stores the content locally. Thereafter, the local network device serves the content via multicast transmission to the user equipment.

20 Claims, 7 Drawing Sheets

(58) Field of Classification Search
CPC ..... H04L 65/602; H04L 65/608; H04L 67/16; H04L 67/10; H04L 29/08018; H04L 29/0809; H04L 29/08648; H04L 12/189; H04L 29/06; H04L 29/06231; H04L 41/0816; H04L 43/10; H04L 47/19; H04L 5/0007; H04L 5/0028; H04L 5/0053; H04L 5/1469; H04L 61/2507; H04L 67/141; H04L 29/08; H04L 41/0806; H04L 41/0886; H04L 41/12; H04L 41/5003; H04L 43/0805; H04L 45/00; H04L 45/16; H04L 45/50; H04L 45/745; H04L 47/122; H04L 47/15; H04L 47/2483; H04L 65/605; H04L 41/0233; H04L 47/30; H04L 5/0091; H04L 67/18; H04L 67/2814; H04L 67/42; H04L 69/324; H04L 12/18; H04L 12/1859; H04L 12/1868; H04L 12/2801; H04L 12/4633; H04L 1/00; H04L 1/0057; H04L 1/0061; H04L 1/0071; H04L 1/0075; H04L 1/06; H04L 2001/0093; H04L 2209/60; H04L 29/06027; H04L 29/06108; H04L 67/12; H04L 67/2842; H04L 65/60; H04L 67/1002; H04L 67/22; H04L 1/0002; H04L 43/06; H04L 43/08; H04L 65/601; H04L 65/604; H04L 67/1097; H04L 67/34; H04L 41/0853; H04L 43/0864; H04L 47/2475; H04L 51/32; H04L 67/06; H04L 67/1095; H04L 67/26; H04L 67/2852; H04L 67/32; H04L 67/322; H04L 69/14; H04L 12/14; H04L 12/1403; H04L 12/1407; H04L 12/1439; H04L 12/185; H04L 12/1854; H04L 12/1881; H04L 1/0041; H04L 1/0042; H04L 1/18; H04L 29/08072; H04L 29/08108; H04L 29/08135; H04L 29/08324; H04L 29/08351; H04L 29/08675; H04L 29/08945; H04L 41/048; H04L 41/5051; H04L 43/00; H04L 43/062

See application file for complete search history.

(56) References Cited

U.S. PATENT DOCUMENTS

| | | | |
|---|---|---|---|
| 2016/0359550 A1* | 12/2016 | Ling | H04B 7/18515 |
| 2017/0272532 A1 | 9/2017 | Lynch et al. | |
| 2017/0374581 A1* | 12/2017 | Dao | H04W 28/06 |
| 2018/0077257 A1* | 3/2018 | Wang | H04L 67/288 |
| 2019/0281490 A1* | 9/2019 | Ravindran | H04W 28/0257 |

* cited by examiner

CACHE AND MULTICAST TECHNIQUES TO REDUCE BANDWIDTH UTILIZATION

CROSS-REFERENCE TO RELATED APPLICATION

This application claims priority to a commonly owned U.S. Provisional Patent Application No. 62/746,463 filed on Oct. 16, 2018, and titled "Cache and Multicast Techniques to Reduce Bandwidth Utilization," which is herein incorporated by reference in its entirety.

BACKGROUND

User equipment (UE) such as wireless phones and other mobile devices configured for telecommunications can receive data using various techniques. Data can comprise pictures, text, videos, audio, and/or other types of content. In some implementations, advertising campaigns comprised of content are broadcast over wireless networks to end user devices. Wireless broadcast is generally more efficient than sending wireless unicast (i.e., "end-to-end") transmissions to individual user devices that may participate in a cellular network to receive advertising content. When multiple users request the same data from the same base station at substantially the same time or request a live stream, the data can be sent by a telecommunications provider, through the Internet and the cellular core network, and broadcast to multiple users at the same time.

However, content delivery consumes an increasing amount of bandwidth though the bandwidth for cellular networks is limited. Specifically, optimizing utilization of the wireless portion or the air interface of the cellular network and the wired portion or the backhaul of the cellular network for advertising content, would preserve network resources and enable other content to be transmitted over the cellular network.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
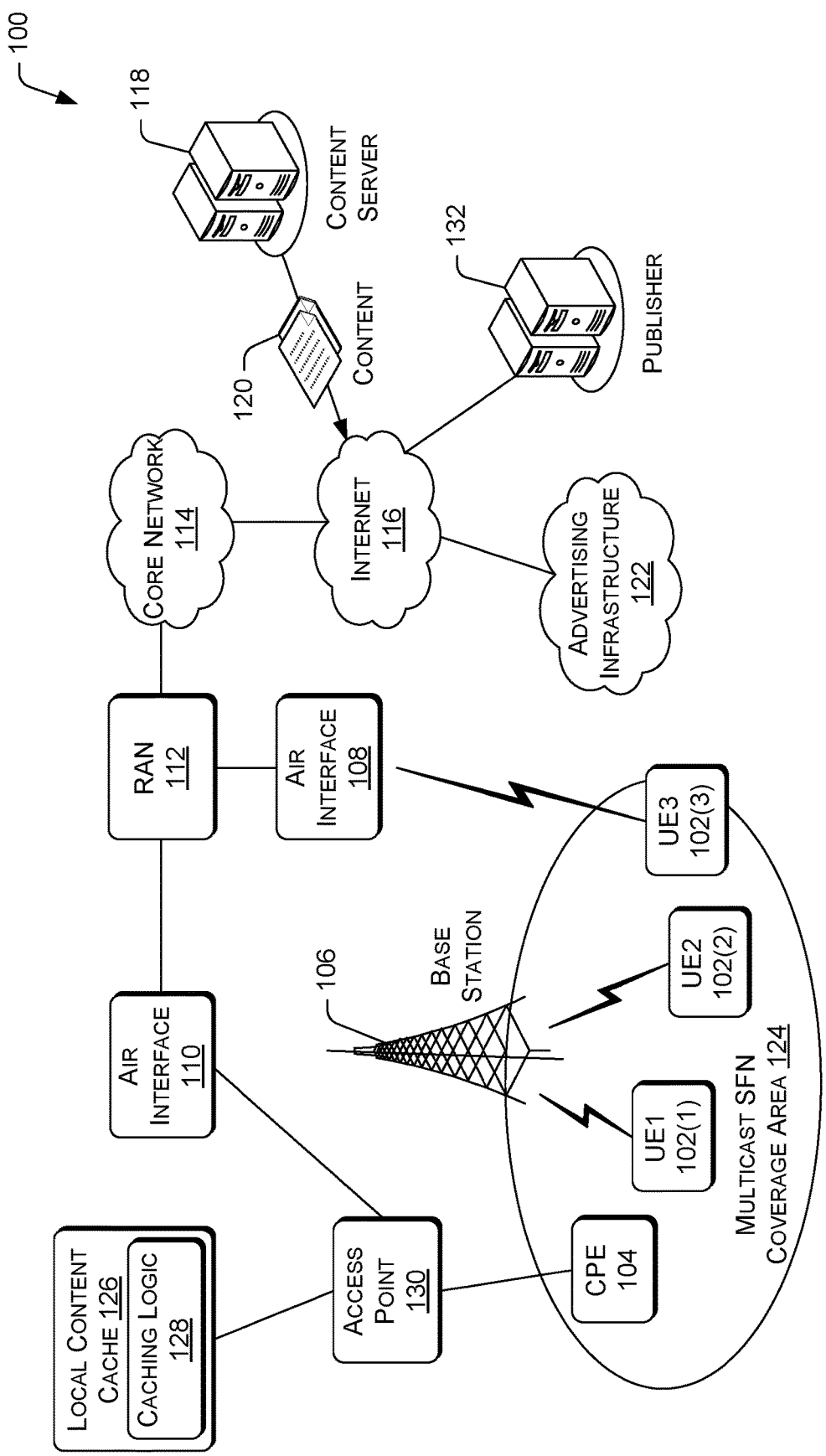
FIG. 1 illustrates an example of network architecture for caching content and optimizing delivery to one or more UEs in a multicast single frequency network (SFN) coverage area.

This disclosure is directed to techniques for caching content locally and serving the cached content via multicast transmission. In some aspects, the techniques may include identifying a content source such as a content server in communication with a network. The content server may receive a request for content from a base station in communication with a UE. The content can include advertisements that may comprise images, videos, audio, and/or other content elements. The UE may be located in a targeted geographic area defined as a multicast single frequency network (SFN) coverage area. Additionally, the multicast SFN coverage area can also include one or more home reception points or customer-premises equipment (CPE). The UE and CPE may communicate with a local access network (LAN) comprised of antennae and base stations. The individual base stations serving the UE and/or CPE in the multicast SFN coverage area is associated with a unique broadcast identifier. The broadcast identifier can identify the base station as well as a locality for the base station.

In some aspects, the content (e.g., advertisements) that are to target a specific locality may be associated with the specific broadcast identifier and base stations, end users, and generally to a multicast SFN coverage area specific to the desired locality. The content server providing the content is identified and the content retrieved from the content server may be delivered substantially concurrently as multicast transmission to the UE and/or CPE in the multicast SFN coverage area. In some implementations, the content may be delivered to the UE and/or CPE in response to a triggering event such as during time aligned breaks (i.e., commercial breaks). If a UE or CPE does not receive the content when the content is multicast, the content may be locally cached at a base station serving the multicast SFN coverage area and broadcast when the UE and/or the CPE is identified as being ready to receive the content.

In some aspects, the content can be locally cached in various local network devices such as base stations, the Mobile Telephone Switching Office (MTSO), edge devices (e.g., routers, routing switches, integrated access devices (IADs), multiplexers, metropolitan area network (MAN) and wide area network (WAN) access devices), local content caches, and/or other network devices. Once the content resides on a base station, the content may be subsequently delivered via multicast transmission as described above. In this way, the UE and/or CPE that are to receive certain content may receive it directly from the base station rather than by making a call to a content server in a cellular core network, or on the Internet. Therefore, the same content need only be broadcast once but may be received by multiple UE and/or CPE.

In some aspects, once the UE and/or CPE receives the content from the base station, the content can be stored locally on the UE and/or CPE. Subsequently, the content may be presented on a user interface of the UE and/or CPE in response to a triggering event (e.g., time aligned breaks) and/or on a scheduled basis. If the content does not reside in the UE and/or CPE, the UE and/or CPE can request content from the base station and/or other local network device such as a local content cache.

The local content cache can include a caching logic that comprises cache clearance and prioritization, and pre-caching. Caches may utilize one or more caching algorithms such as first in first out and round-robin. If the content includes advertisements, caches may leverage advertising campaign information. Specifically, advertising is often keyed to a specific time, such as a time aligned break in a program or show that is being streamed to a UE or CPE. Furthermore, advertising campaigns may be known to stop at a particular time. Upon the end of the last time aligned break of the advertising campaign, the cache may be cleared of the corresponding advertising campaign. Caches may also make use of advertising campaign information to prepopulate the caches (i.e., pre-caching) with advertising content before the first time aligned break of the advertising campaign.

In some embodiments, a machine learning system may be implemented to monitor operation and actual end user behavior to inform pre-caching. Specifically, as the machine learning system learns behaviors of end users and the accuracy of the caching (i.e., high cache hit rates), advertising content most likely to be accessed may be pre-cached and collocated within a target audience's broadcast location (e.g., a multicast SFN coverage area).

Example Network Architecture

FIG. 1 illustrates an example of network architecture 100 for caching content and optimizing delivery to one or more UEs and/or CPEs in a multicast single frequency network (SFN) coverage area. In the illustrated embodiment, the UEs and the CPE are located in a targeted geographical area defined as a multicast SFN coverage area 124. The UEs 102(1)-102(3) described herein may be implemented as any suitable communication devices configured to communicate over a wireless network, including, without limitation, a mobile phone (e.g., a smartphone), a tablet computer, a laptop computer, a desktop or personal computer, a set-top-box (STB), a game console, a smart television, a personal digital assistant (PDA), a wearable device (e.g., electronic/smart glasses, a smartwatch, fitness trackers, etc.), a networked digital camera, and/or other electronic devices capable of receiving input and providing output. The individual UEs 102(1)-102(3) include a Universal Integrated Circuit Card (UICC) or a Subscriber Identity Module (SIM) card.

The CPE 104 can include telephones, routers, network switches, residential gateways, set-top boxes, fixed mobile convergence products, home networking adapters, Internet access gateways, and/or other devices that enable subscribers to access telecommunications services and distribute them in a residence or entrance with a LAN. Additionally, the UEs 102(1)-102(3) and/or the CPE 104 can include a user interface (UI) including a display, a speaker, a vibration unit, a touch screen, or other devices for presenting information to a user and receiving commands from the user. The UI or components thereof (e.g., the display) can be separate from the UEs 102(1)-102(3) and/or the CPE 104.

The UEs 102(1)-102(3) and/or the CPE 104 may be connected to an access network (e.g., the RAN 112) over a physical communications interface or layer such as air interface 108 and 110 and/or direct-wired connection. The air interface 108 and 110 can comply with a given network communications/data technology, protocol, or standard, such as Global system for Mobile communications (GSM), Time Division Multiple Access (TDMA), Universal Mobile Telecommunications System (UMTS), Evolution-Data Optimized (EVDO), 2G, 3G, 4G, 5G, Long Term Evolution (LTE), Advanced LTE, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, Wi-Fi, a local area network (LAN), a wide area network (WAN), a collection of networks (e.g., the Internet), and/or any future IP-based network technology or evolution of an existing IP-based network technology.

The RAN 112 includes a plurality of access points (APs) 130 that serves the UEs 102(1)-102(3) and/or CPE 104 over the air interface 108 and 110. The access points 130 in the RAN 112 can be referred to as access nodes (ANs). In the illustrated embodiment, the access points 130 in the RAN 112 is depicted as base stations (e.g., Node Bs, eNode Bs, etc.) 106(1) and 106(2). The individual base stations 106(1) and 106(2) are associated with a unique broadcast identifier. The broadcast identifier can be used to identify a specific base station and the multicast SFN coverage area 124 in which it serves. The RAN 112 is configured to connect to a core network 114 that can perform a variety of functions, including bridging circuit switched (CS) calls between UEs 102(1)-102(3) and/or CPE 104 served by the RAN 112 and other UE and/or CPE served by the RAN 112 or a different RAN altogether, and can also mediate an exchange of packet-switched (PS) data with external network(s) such as the Internet 116.

The architecture 100 further comprises an advertising infrastructure 122, which may be connected via the Internet 116, accessible by the core network 114 via a network gateway (not pictured). The advertising infrastructure 122 may be in communication with one or more publishers 132 of content (e.g., online or digital publications, websites, etc.). The advertising exchange broker platform may provide a real-time bidding market that allows advertisers to bid on publisher inventory in real-time. In some aspects, the advertising exchange broker platform may be configured to provide a market floor auction for advertisement placement, which includes determining an auction winner based on bids submitted by advertisers. The advertising infrastructure 122 can include a plurality of computing nodes arranged in a distributed, computation, and storage grid.

The advertising infrastructure 122 includes an advertising exchange broker platform in communication with a supply side platform (SSP), a demand side platform (DSP) advertising content, and a data management platform (DMP). The SSP is an advertising technology platform used by publishers to manage, sell, and optimize available inventory (e.g., advertisement space) on their websites and mobile applications. The SSP contains and serves advertising content from content sources such as a content server 118, which can also be connected with a network gateway via the Internet 116. While only one content server 118 is shown, the SSP can interact with a plurality of content servers. For instance, the content server 118 can comprise a single server or one or more clouds of servers, application specific integrated circuits (ASICs), field programmable gate arrays (FPGAs), system on a chip systems (SoCs), tablet computers, laptops, desktops, and/or other general computing devices. The DSP allows buyers of digital advertising inventory to manage multiple advertisement exchange and data exchange accounts. The DSP contains information about potential recipients (i.e., subscribers) of advertising content. In various embodiments, the DMP may implement a data collector to request usage data (collected with the consent of the pertinent users or anonymously) for the purposes of valuing either advertisement impressions and/or the users engaging the websites on which ads are likely to be placed. The DMP may also provide usage data and other information associated with individual recipients in order to identify triggering events to present advertising content to the individual recipients at a predetermined time.

The SSP receives content 120 (e.g., advertisements) from the content server 118. The content server 118 can include various types of computing devices or nodes that can transmit or stream content via the Internet 116 or another network. The content server 118 can be operated by a telecommunications service provider or another entity. In one example, the content server 118 can be operated by an advertiser. The content server 118 may also be a component of the advertising exchange broker platform that receives images, text, audio, video, and/or other content from various content providers. In another example, the content server 118 can use components of the core network 114 to download content from third party servers (not pictured) to make the content available within the core network 114.

The content 120 can include two-dimensional and/or three-dimensional images, text, audio, videos comprising audiovisual data, virtual reality (VR)/augmented reality (AR)/mixed reality (MR) elements, and/or so forth. Additionally, the content 120 may be pre-recorded or live. Additionally, content 120 can include firmware or software for various computing devices. The individual content can be associated with a tag (e.g., executable JavaScript tags) or a content identifier.

In one example, the UE 102(1) can request content by sending a content request to a base station 106 serving the multicast SFN coverage area 124. The UE 102(1) can utilize various communication protocols or predetermined protocols such as an IP transmission to send the content request. The base station 106 can forward the IP transmission to the content server 118. The content request can be sent via a signaling path using various signaling protocols and techniques (e.g., Session Initiation Protocol (SIP)). Additionally, the content request may pass through various proxies, servers, agents, and/or so forth.

In response to the content request, the content server 118 provides content 120 to a network gateway, such as an LTE packet data network (PDN) gateway (PGW), that can be configured to pass traffic between different networks (e.g., core network 114 and the multicast network 114) or between terminals or nodes within a network. The network gateway then provides the content 120 via a media path to the requesting base station 106, which in turn delivers the content 120 to the UEs 102(1)-102(3) and/or CPE 104 in the multicast SFN coverage area 124. In various embodiments, the content 120 may be routed to a particular base station 106 associated with a broadcast identifier. The content server 118 can communicate via the signaling path or the media path.

The content server 118 may comprise logic for selectively distributing content 120 to the UEs 102(1)-102(3) and/or CPE 104 based at least on the content request. The content request may include user data associated with the UEs 102(1)-102(3) and/or CPE 104. For example, the usage data can include clickstream data, search data, purchase data, profile data, and/or other data associated with users of the UEs 102(1)-102(3) and/or CPE 104. Additionally, user data can indicate one or more triggering events. For instance, one or more triggering events can include clicking on a link, moving into a multicast SFN coverage area or a different multicast SFN coverage area, commercial breaks, and/or so forth. The content request can also include subscriber information associated with the requesting UEs 102(1)-102(3) and/or the CPE 104. For example, the subscriber information can be associated with a user account. The user account can correspond to an account identifier or a subscriber identifier that is associated with one or more subscribers of a telecommunications service provider. For example, the account identifier or the subscriber identifier may be a Mobile Station International Subscriber Directory Number (MSISDN), an International Mobile Subscriber Identity (IMSI), a subscriber account number, and/or so forth. The subscriber information can be associated with the broadcast identifier of the base station 106 serving the UEs 102(1)-102(3) and/or CPE 104 associated with the subscriber information. In this way, the subscriber information can be used to identify the multicast SFN coverage area 124 in which the UEs 102(1)-102(3) and/or CPE 104 is located.

The content 120 may be associated with a broadcast identifier of the base station 106 serving one or more UEs 102(1)-102(3) and/or CPE 104 in the multicast SFN area 124. In this way, the content 120 may be specific to the multicast SFN area 124 or a targeted geographical region. For example, the content 120 may comprise advertisements for a retail store located in the multicast SFN area 124. Accordingly, if the content 120 is not associated with a broadcast identifier of the base station 106, the content 120 may not be broadcast in the multicast SFN area 124. Additionally, or alternatively, the base station 106 may request the content 120 that is associated with a specific content identifier. In this regard, the base station 106 may store a list of content identifiers associated with content that may be provided to the base station 106. Upon retrieving the content 120 from the content server 118, the base station 106 can serve the UEs 102(1)-102(3) and/or CPE 104 associated with a subscriber identifier in response to receiving a content request from the UEs 102(1)-102(3) and/or CPE 104. Additionally, the content 120 may be cached at the base station 106 and/or other local network devices such as the local cache content 126. In some embodiments, the base station 106 can comprise the local content cache 126. Additionally, or alternatively, the base station 106 or other local network devices can be operatively connected to a separate storage device or partition separate from generating storage of the base station 106 or other local network devices.

The local content cache 126 comprises caching logic 128. The caching logic 128 generally facilitates pushing or dumping of data, which include the content, usage data, and/or so forth. The caching logic 128 includes a set of functions for providing cache clearance and prioritization and pre-caching. For instance, the local content cache 126 may utilize one or more caching algorithms, such as first in first out, round-robin, and/or so forth. The content 120 may be designated as a high priority content if the content 120 is has a high-value advertisement impression. Additionally, or alternatively, the content 120 may be designed as a high priority content if the content 120 is directed to a specific topic or subject. If the content 120 includes advertisements, the local content cache 126 may leverage advertising campaign information. For instance, content 120 comprising advertising may be keyed to a specific time, such as a time aligned break in a streaming content. Furthermore, the advertising campaigns may be known to automatically expire at a particular time or after a predetermined period of time. For example, content 120 relating to a specific event occurring on a particular date and time. Upon the end of the last time aligned break of the advertising campaign for the event, the local content cache 126 may be cleared of the corresponding advertising campaign. In some implementations, local content cache 126 may also make use of advertising campaign information to prepopulate the caches (i.e., pre-caching) with content 120 before the first time aligned break of the advertising campaign in a streaming content such as video.

Once the content 120 is cached at one or more base stations 106(1) and 106(2) or another local network device (e.g., the local content cache 126), the content 120 may be subsequently re-broadcasted from the base station 106. If the content 120 is cached at a local network device, the base stations 106(1) and 106(2) may interface with the local network device to retrieve the content 120. The UEs 102 (1)-102(3) and/or CPE 104 can request the content 120 from the base station 106 or another local network device (e.g., local content cache 126) using the broadcast identifier or the IP address of the local network device. The content 120 may be immediately consumed by the UEs 102(1)-102(3) and/or CPE 104 and presented at the user interface of the UEs 102(1)-102(3) and/or CPE 104. Additionally, or alternatively, the content can be stored in a memory unit of the UEs 102(1)-102(3) and/or CPE 104 and presented at a later time.

The content server 118 may provide content update instructions. For example, if the content 120 is updated for an advertising campaign, the content server 118 may provide notifications comprising the content update instructions. The content server 118 may utilize a push model to send content update instructions to the base station 106 at the access network to push specific content to the base station 106. The content update instructions can indicate the UEs 102(1)-102 (3) and/or CPE 104 that are to receive updated content. In response to receiving the content update instructions, the base station 106 can request updated content from the content server 118. Upon receiving the updated content, the base station 106 may transmit the updated content to the UEs 102(1)-102(3) and/or CPE 104. Additionally, the base station 106 may cache the updated content.

The base station 106 serving the UEs 102(1)-102(3) and/or CPE 104 in the multicast SFN coverage area 124 comprises a multicast function to transmit content to multiple UEs 102(1)-102(3) and/or CPE 104 concurrently by multicast transmission. In some implementations, the base station 106 may be in communication with a multicast network that comprises one or more routers that may have one or more interfaces, where each interface provides a physical connection to the router. For example, a router may have one or more interfaces for copper cables, fiber optic cables, or antennas for wireless transmissions. The routers may be connected to a switch. Each router interface may have one or more Internet Protocol (IP) addresses. The routers can receive a join request for a multicast address group from one or more UEs 102(1)-102(3) and/or CPE 104 (i.e., a host or a receiver) to receive specific content, messages, and/or advertisements from the content server 118. Alternatively, the routers can receive a withdrawal request to leave a multicast address group from one or more UEs 102(1)-102(3) and/or CPE 104.

Various multicast routing protocol may be used to manage multicast address groups, including Internet Group Management Protocol (IGMP), Protocol Independent Multicast Sparse Mode (PIM-SM), Protocol Independent Multicast (PIM) Dense Mode (PIM-DM), Distance Vector Multicast Routing Protocol (DVMRP), Bi-direction PIM (BIDIR-PIM), and/or so forth. Additionally, multicast routing may use a source or shared distribution tree structure. In some embodiments, the cache of the multicast functions may be expanded to increase cache size of the base station 106. In other embodiments, if the content server 118 is operated by an advertiser and advertising functionality is local to the base station 106, the content server 118 capable of processing advertising campaign programs may be located at the base station 106 with large cache storage.

Example Data Flow

Figure 2:
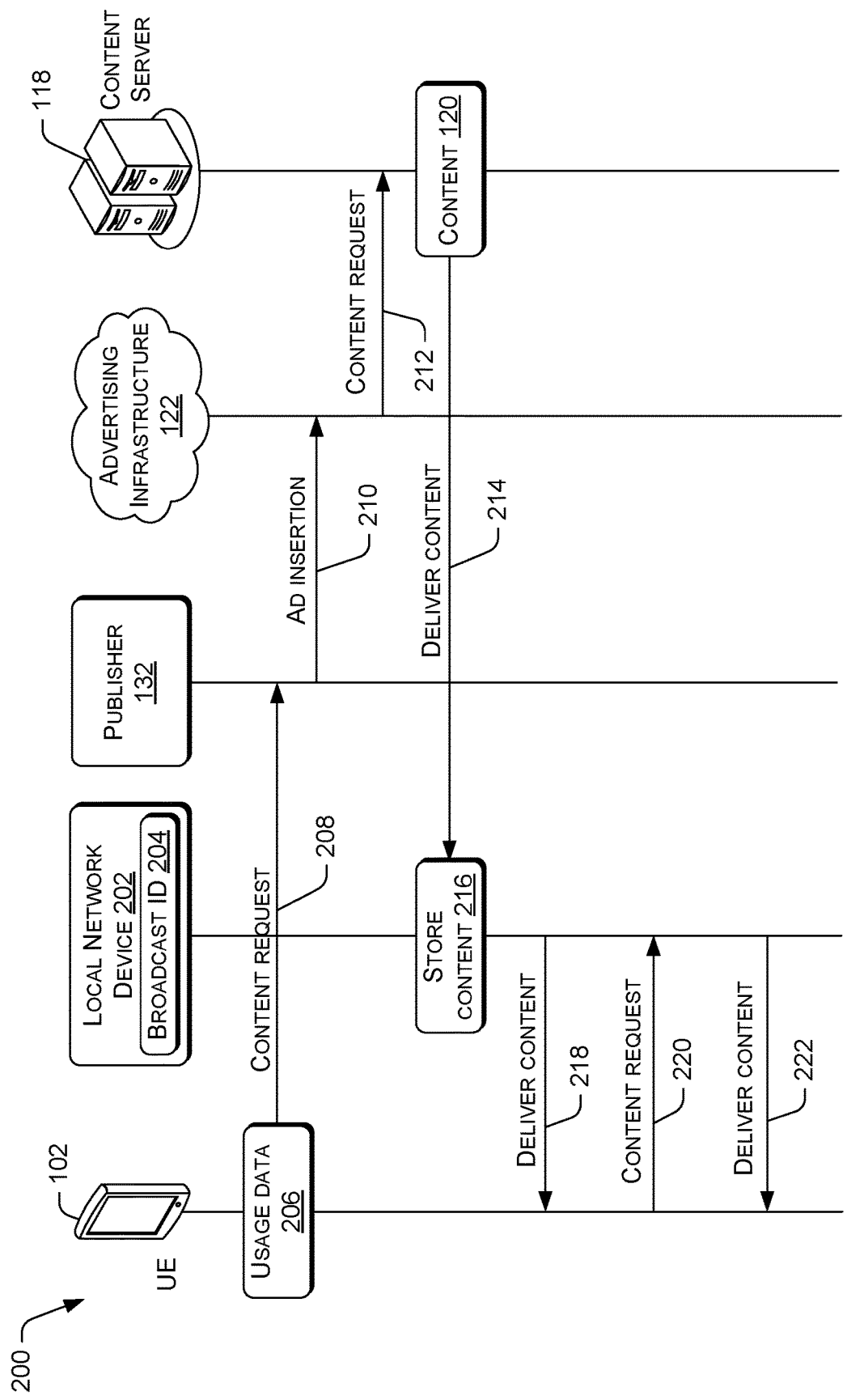
FIG. 2 is a data flow diagram showing the process for caching content at a local network device and optimizing the delivery of the content from the local network device to a UE.
Figure 3:
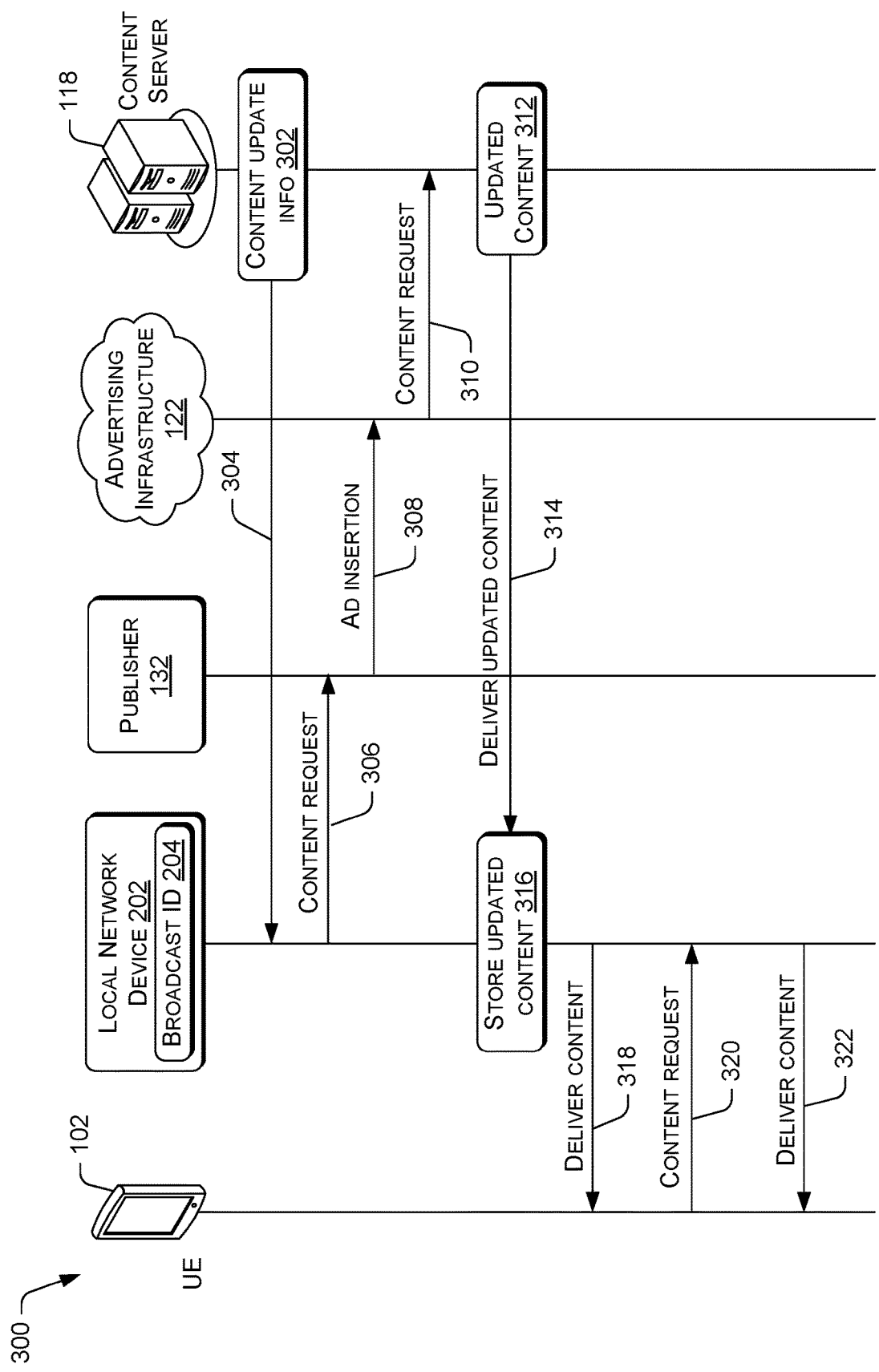
FIG. 3 is a data flow diagram showing the process for receiving content update instructions and updating the content at a local network device.

FIGS. 2 and 3 show data flow diagrams showing the process for caching content or updated content at a local network device such as a base station or a local content cache and optimizing the delivery of the content from the local network device to a UE 102. The processes 200-300 are described with reference to FIG. 1. As illustrated in FIGS. 2 and 3, the local network device 202 may correspond to the base station 106 or the local content cache 126 in FIG. 1. Additionally, the UE 102 may correspond to the UEs 102(1)-102(3) and/or CPE 104 in FIG. 1.

At 208 of FIG. 2, the UE 102 may transmit a content request for advertisement to a publisher 132. The content request may include usage data 206 associated with the UE 102. For instance, the usage data 206 can include clickstream data, search data, purchase data, profile data, and/or so forth. For example, the usage data 206 may indicate the particular multicast SFN coverage area in which the UE 102 is in communication with an access network(s) comprising a base station associated with a unique broadcast identifier. At 210, in response to receiving the content request, the publisher 132 may transmit a notification to the SSP at the advertising infrastructure to provide an advertisement content for insertion into a streamed content (i.e., videos, programs, shows, etc.) at least in part according to usage data. The advertising exchange broker platform at the advertising infrastructure facilitates the auction to insert an advertisement. At 212, the SSP at the advertising infrastructure 122 requests an advertisement content from the winning advertiser. At 214, the content server 118 delivers advertisement content 120 to the local network device 202 associated with the broadcast identifier 204, wherein the local network device 202 serves the UE 102 in the multicast SFN coverage area. The advertisement content is stored 216 at the local network device 202. At 218, the local network device 202 delivers the advertisement content to the UE 102. At 220, all subsequent advertisement content request is directly transmitted to the local network device 202. At 222, the response is delivered to the UE 102.

At 304 of FIG. 3, the content server 118 may transmit a content update information 302 to the local network device 202. In one example, the content update information 302 may include information for the content update to be served to specific UE 102 in a particular multicast SFN coverage area that the local network device 202 serves. At 306, in response, the local network device 202 then issues a request to the publisher 132 for content to be served in response to the content request. At 308, in response, the publisher 132 issues an advertisement insertion or a request to the advertisement infrastructure 122 for content to be served in response to the content request. At 310, the advertisement infrastructure 122 provides a content request for updated content to the content server. 118. At 314, the content server 118 delivers the updated content 312 to the local network device 202. Upon receiving the updated content 312, the local network device 202 stores the updated content 316 and delivers the content at 318. At 320, the local network device 202 receives requests to deliver content to the UE 102. At 322, in response, the local network device 202 returns a content to be served to the UE 102.

Example Computing Device Components

Figure 4:
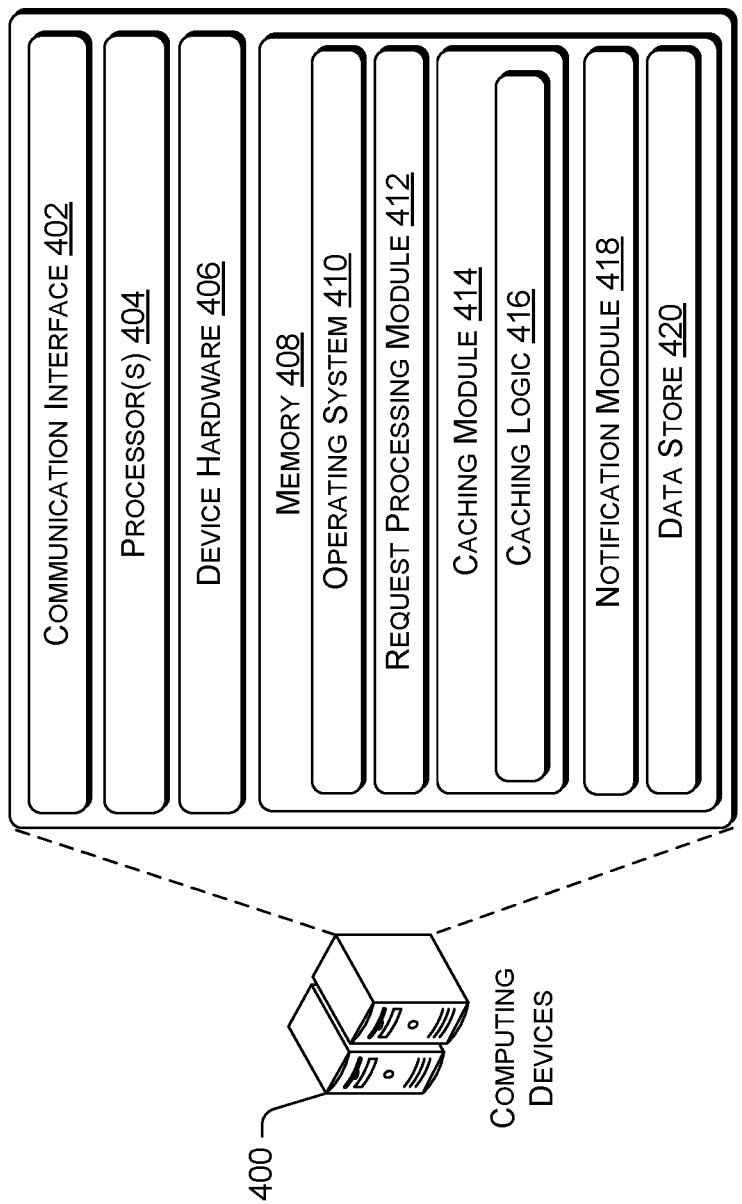
FIG. 4 is a block diagram showing various components of an illustrative computing device that implements content caching from a content server.

FIG. 4 is a block diagram showing various components of illustrative computing devices 400 for caching content from a content server and delivering the content to a UE and/or CPE via multicast transmission. It is noted that the computing devices 400 as described herein can operate with more or fewer of the components shown herein. Additionally, the computing devices 400 as shown herein or portions thereof can serve as a representation of one or more of the computing devices of the present system such as a base station, a content cache, or other local network devices.

The computing devices 400 may include a communication interface 402, one or more processors 404, hardware 406, and memory 408. The communication interface 402 may include wireless and/or wired communication components that enable the computing devices 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing devices 400.

The memory 408 may store several software components including an operating system 410, a request processing module 412, caching module 414, a notification module 418, and a data store 420. The data store 420 can comprise a data management layer that includes software utilities for facilitating the acquisition, processing, storing, reporting, and analysis of data from multiple data sources. In various embodiments, the data store 420 can interface with an API for providing data access. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode. In various embodiments, the data store 420 can comprise a separate storage device or partition separate from generating storage of the computing devices 400. In some examples, the local content cache can comprise a data store.

The operating system 410 may include components that enable the computing devices 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The request processing module 412 may be configured to process content requests that are received from a UE or CPE in the multicast SFN coverage area and request for content from a content server (e.g., content server 118) in response for sending to the UE or CPE. The request processing module 412 may also receive a request from additional entities such as the content server. For example, the request processing module 412 may receive a request from the content server for usage data associated with the UE and/or CPE. The request processing module 412 may also request additional information in response to receiving a request from the UE and/or CPE. In some aspects, the request processing module 412 may request information from the UE and/or CPE using a pulling mechanism.

While the operation of the request processing module 412 is described for handling a single content request, it should be recognized that the request processing module 412 can be scaled to handle a plurality of content requests. The request processing module 412 can store information about the content request. For example, the information stored includes the source of the request, the site of the request, information about the content placement and other metrics. The request processing module 412 then issues a request to the publisher for content to be served in response to the content request.

The caching module 414 can receive content from a content source (e.g., content server) and store the content in a cache. Additionally, the caching module 414 can receive content update instructions from the content server and update the cache in response. The caching module 414 can include caching logic 416. Caching logic 416 can be made to work according to various predefined limitations, such as time constraint that indicate the amount of time the content is to be cached, size constraint that indicates limits on how much data is to be stored at the local content cache, and/or so forth. Additionally, various refresh and clear operations, prioritization functions, and pre-caching operations may be supported.

The caching logic 416 can perform its functions based at least on information related to the content, content server, usage data, and/or so forth. In some aspects, caches may utilize one or more caching algorithms such as first in first out and round-robin. If the content includes advertisements, the caches may leverage advertising campaign information. Specifically, advertising is often keyed to a specific time, such as a time aligned break. Furthermore, advertising campaigns may be known to stop at a particular time. Upon the end of the last time aligned break of the advertising campaign, the cache may be cleared of the corresponding advertising campaign. Caches may also make use of advertising campaign information to prepopulate the caches (i.e., pre-caching) with advertising content before the first time aligned break of the advertising campaign.

The notification module 418 may be configured to serve content in response to the received content request. The notification module 418 may serve the content on a scheduled basis or upon request from the content server. The notification module 418 may serve the content selectively to the UE and/or CPE. In some examples, the notification module 218 may select certain content to be distributed in response to a content request based at least on information associated with the requesting UE and/or CPE such as the usage data associated with the UE and/or CPE. Additionally, the notification module 218 may select content to be distributed based at least on the multicast coverage area in which the UE and/or CPE resides. If the content comprises a time-specific content or the requested content is no longer available, the notification module 218 can return an error message. In response, the request processing module 412 can request updated content from the content server.

Example Processes

Figure 5:
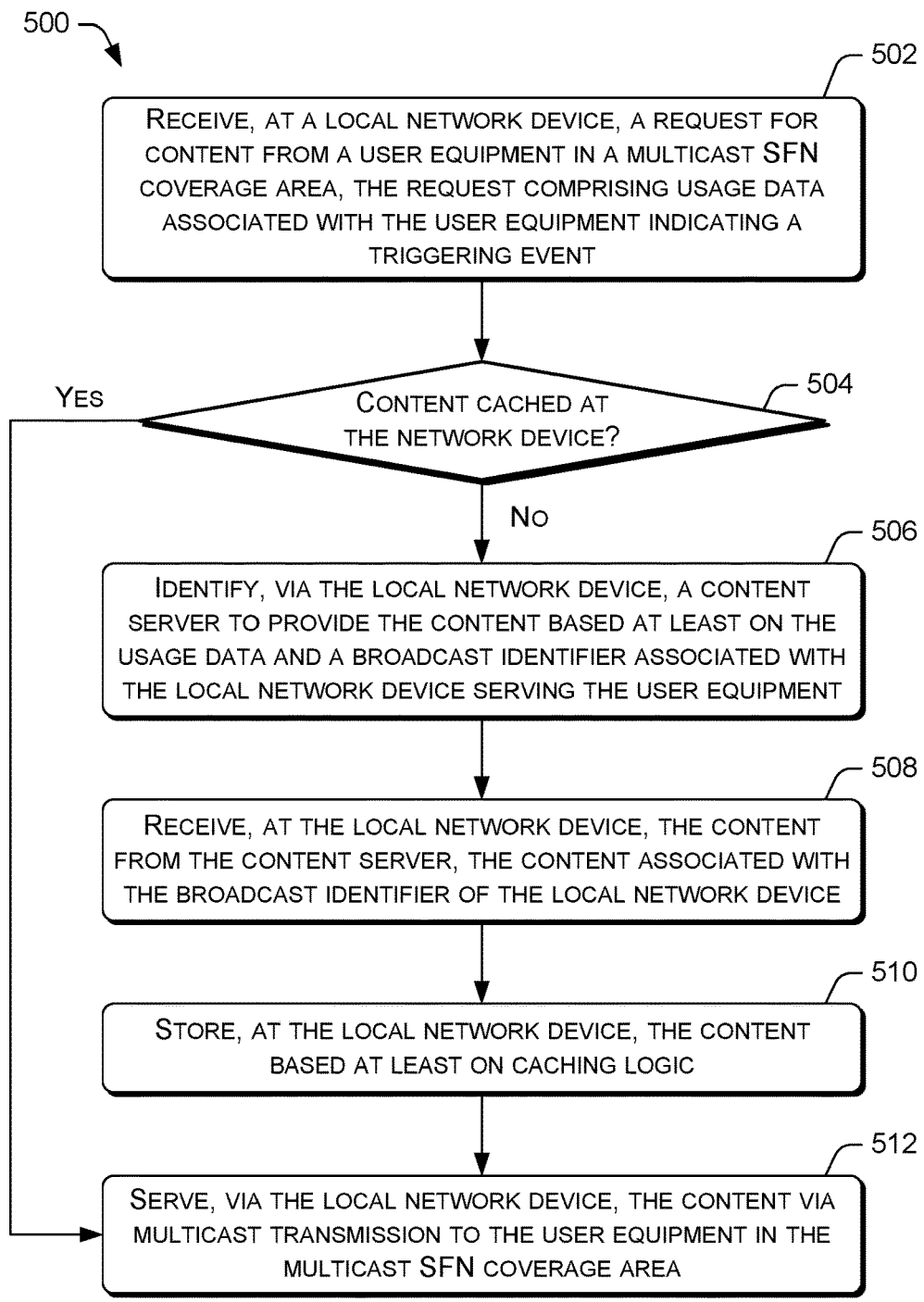
FIG. 5 is a flow diagram of an example process for caching content at a network device that can serve a UE in a multicast SFN coverage area.
Figure 6:
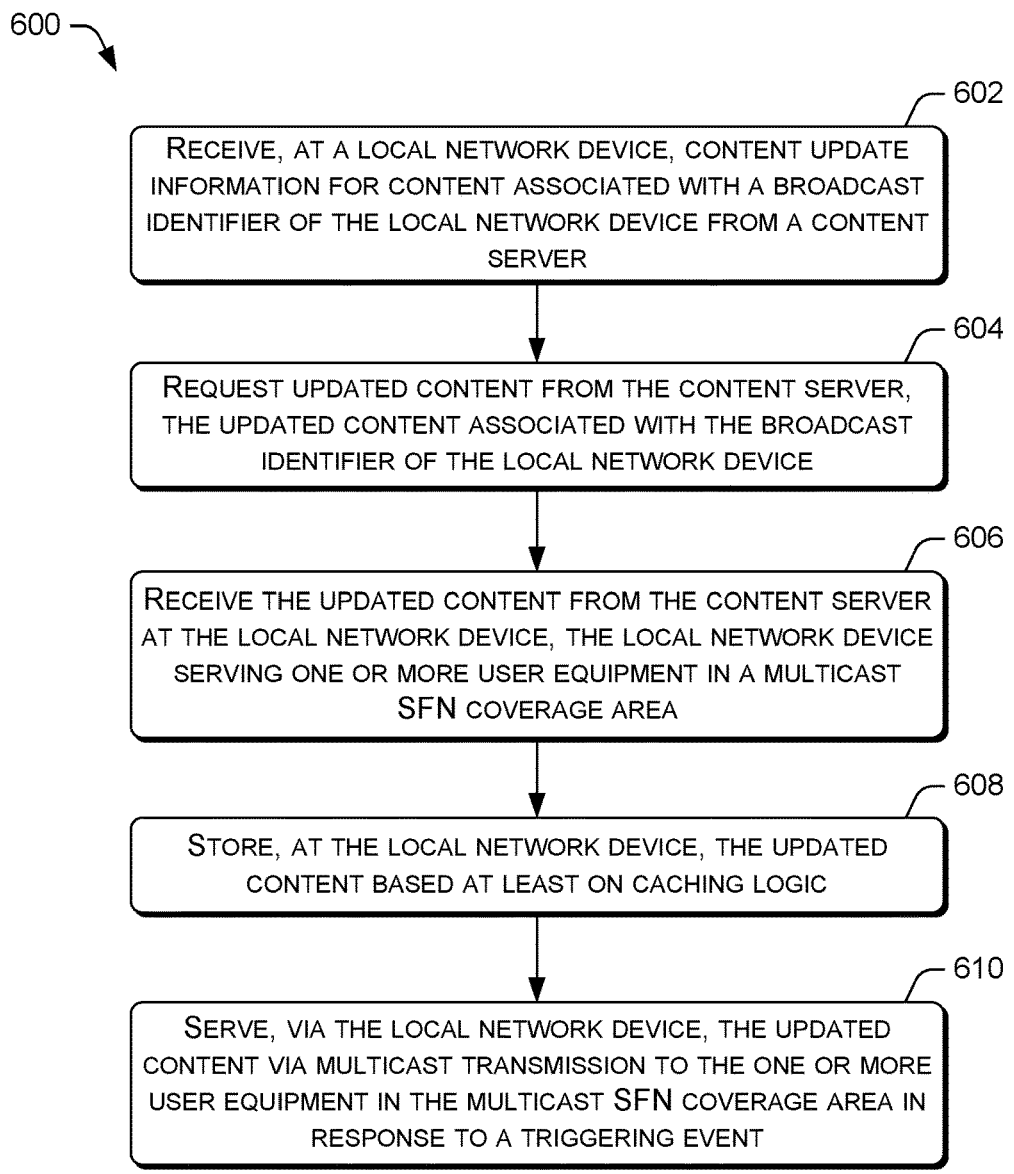
FIG. 6 is a flow diagram of an example process for updating cached content in response to cache update instructions received from a content server.
Figure 7:
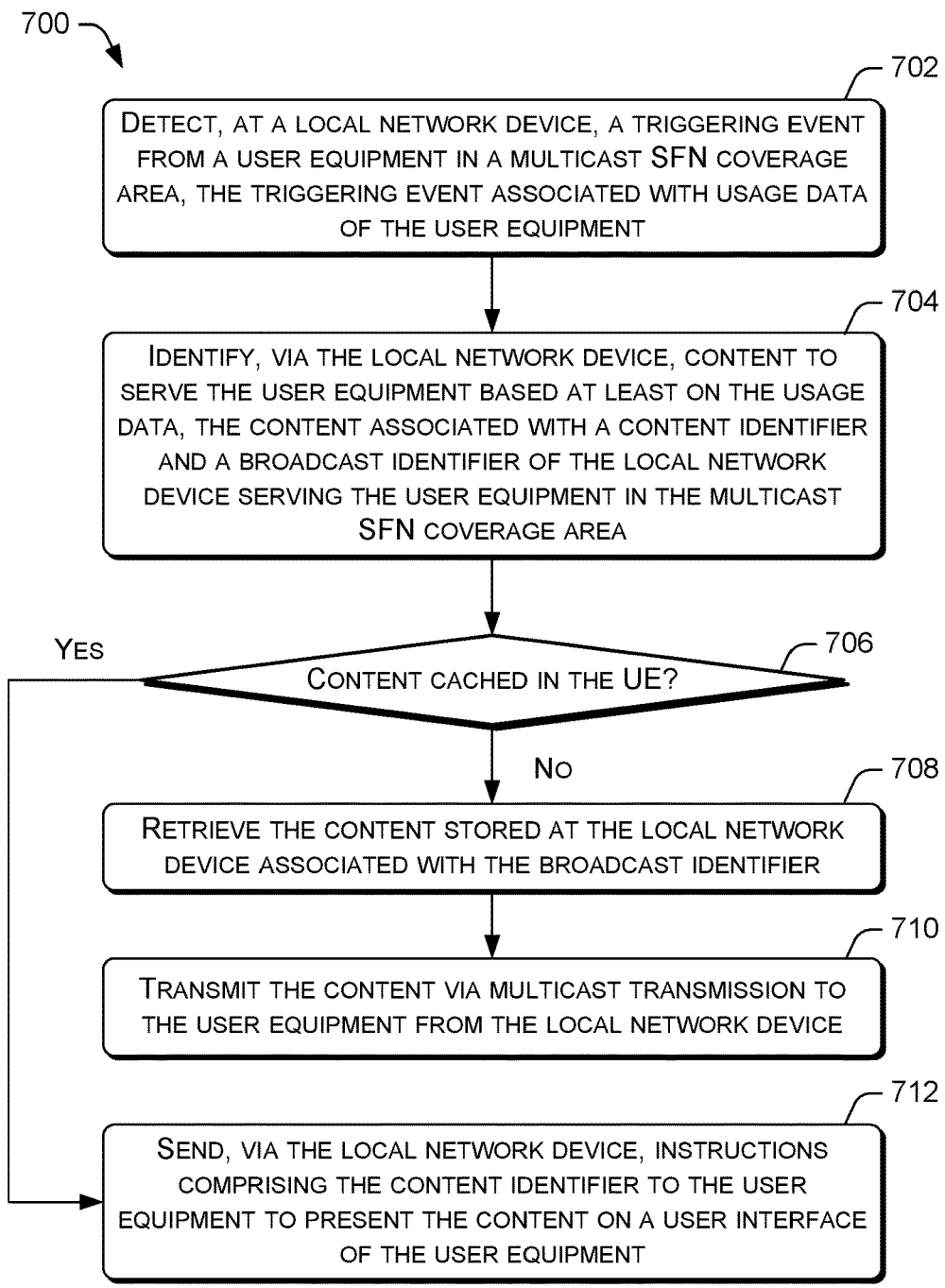
FIG. 7 is a flow diagram of an example process for providing cached content at a UE and/or CPE in a multicast SFN coverage area.

FIGS. 5 through 7 present illustrative processes 500-700 for caching content at a local network device and multicasting the cached content to a plurality of UEs and/or CPEs located in a multicast SFN coverage area. The processes 500-700 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to FIGS. 1-4.

FIG. 5 is a flow diagram of an example process 500 for caching content at a network device that can serve one or more UEs in a multicast SFN coverage area. At block 502, a local network device receives a request for content from a UE in a multicast SFN coverage area. The UE can comprise a CPE. The request comprises usage data associated with the UE indicating a triggering event. The usage data can include at least one of clickstream data, search data, purchase data, and profile data associated with the UE. Additionally, the usage data can include data relating to any streaming content being presented at the UE, such as video. In this scenario, the triggering event can include a time aligned break during the presentation of the video at the UE.

At decision block 504, the local network device determines whether the content is cached at the local network device. In some aspects, the local network device comprises a base station or a local content cache. If the content is not cached at the local network device ("no" from block 504), the local network device identifies a content server to provide the content based at least on the usage data and a broadcast identifier associated with the local network device serving the UE, as indicated in block 506. The content server may be associated with an advertiser that can provide advertisements (i.e., content) to insert in the streaming content (e.g., video) currently being streamed to the UE.

If the local network device determines that the content is cached ("yes" from block 504), the local network device serves the content via multicast transmission to the UE in the multicast SFN coverage area as indicated in block 512. The UE can be a member of a multicast address group by proactively joining the group. The UE can also subsequently leave a multicast address group by leaving the group. Additionally, the UE may move in and out of a multicast SFN coverage area. If the UE moves into a new multicast SFN coverage area, the UE may receive content that is associated with a broadcast identifier of a new network device that is located in the new multicast SFN coverage area. At block 508, the local network device receives the content from the content server. The content is associated with the broadcast identifier of the local network device. In this way, the content may be specific to the multicast SFN coverage area in which the local network device is located. At block 510, the local network device stores the content based at least on caching logic. Various caching logic may be implemented such as cache clearing. For example, the content may be associated with an advertising campaign that automatically expires after a predetermined period of time. Additionally, the local network device may implement a per-permission-set caching logic to reduce memory usage and cache a minimal set of content and related data. At block 512, the local network device serves the content via multicast transmission to at least the UE in the multicast SFN coverage area.

FIG. 6 is a flow diagram of an example process 600 for updating cached content in response to cache update instructions received from a content server. At block 602, a local network device receives content update information for content associated with a broadcast identifier of the local network device from a content server. At block 604, in response to the content update information, the local network device requests updated content based at least on the content update information from the content server. The updated content is also associated with the broadcast identifier of the local network device. At block 606, the local network device receives the updated content from the content server, wherein the local network device serves one or more UEs in a multicast SFN coverage area.

At block 608, the local network device stores the updated content based at least on caching logic as described above. At block 610, the local network device serves the updated content via multicast transmission to a UE in the multicast SFN coverage area in response to a triggering event. The content may be routed to the UE that is a member of a multicast address group. The UE may subsequently leave the multicast address group. In response, the UE may not receive the content from the local network device. In some aspects, content-based routing may be implemented in order to selectively deliver the content to the UE, wherein the UE may receive content based on information associated with the content. In this regard, the UE may receive certain content without joining the multicast address group.

FIG. 7 is a flow diagram of an example process 700 for providing cached content at a UE in a multicast SFN coverage area. At block 702, a local network device detects a triggering event from the UE in a multicast SFN coverage area. The triggering event may be associated with usage data of the UE. For example, the usage data may include search data, and the triggering data may be when a user of the UE clicks one of the search results included in the search data. At block 704, the local network device identifies content to serve the UE based at least on the usage data. In some implementations, the local network device identifies content to serve the UE based at least on the content. Additionally, the content is associated with a content identifier and a broadcast identifier of the local network device serving the UE in the multicast SFN coverage area.

At decision block 706, the local network device determines whether the content is cached or stored in the UE. If the content is cached in the UE ("yes" from block 706), the local network device may send the instructions comprising the content identifier to the UE to present the content on a user interface of the UE, as indicated in block 712. In this way, the local network device need only provide the content identifier instead of the content. If the content is not cached in the UE ("no" from block 706), the local network device retrieves the content that is cached at the local network device, wherein the content is associated with the broadcast identifier, as indicated in block 708. At block 710, the local network device transmits the content via multicast transmission to the UE from the local network device. The UE may cache the content.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions of a local network device that upon execution cause one or more processors to perform acts comprising:
   receiving, at the local network device, a request for content from a user equipment in a multicast single frequency network (SFN) coverage area, the request comprising usage data associated with the user equipment indicating a triggering event;
   determining whether the content is cached at the local network device;
   in response to determining that the content is not cached at the local network device, determining, at the local network device, a broadcast identifier that identifies the local network device serving the user equipment and the SFN coverage area;
   identifying, via the local network device, a content server to provide the content based at least on the usage data and the broadcast identifier that identifies the local network device serving the user equipment and the SFN coverage area;
   receiving, at the local network device and from the content server, the content;
   storing, at the local network device, the content received from the content server;
   determining, at the local network device, that the content received from the content server is associated with the broadcast identifier of the local network device; and
   based on determining that the content received from the content server is associated with the broadcast identifier of the local network device, serving, via the local network device, the content via multicast transmission to the user equipment in the multicast SFN coverage area for presenting the content at the user equipment.

2. The one or more non-transitory computer-readable media of claim 1, wherein the acts further comprise:
   receiving, at the local network device, content update information for the content from the content server;
   requesting updated content from the content server based at least on the content update information, the updated content associated with the broadcast identifier of the local network device;
   receiving the updated content from the content server at the local network device;
   storing, at the local network device, the updated content received from the content server; and
   serving, via the local network device, the updated content via the multicast transmission to the user equipment in response to a triggering event.

3. The one or more non-transitory computer-readable media of claim 2, wherein the triggering event comprises time aligned breaks.

4. The one or more non-transitory computer-readable media of claim 1, wherein the usage data includes at least one of clickstream data, search data, purchase data, and profile data associated with the user equipment.

5. The one or more non-transitory computer-readable media of claim 1, wherein the local network device comprises a base station.

6. The one or more non-transitory computer-readable media of claim 1, wherein the user equipment comprises customer-premises equipment.

7. A computer-implemented method, comprising:
   receiving, at a local network device, a request for content from a user equipment in a multicast single frequency network (SFN) coverage area, the request comprising usage data associated with the user equipment indicating a triggering event;
   determining whether the content is cached at the local network device;
   in response to determining that the content is not cached at the local network device, determining, at the local network device, a broadcast identifier that identifies the local network device serving the user equipment and the SFN coverage area;
   identifying, via the local network device, a content server to provide the content based at least on the usage data and the broadcast identifier that identifies the local network device serving the user equipment and the SFN coverage area;
   receiving, at the local network device and from the content server, the content;
   storing, at the local network device, the content received from the content server;
   determining, at the local network device, that the content received from the content server is associated with the broadcast identifier of the local network device; and
   based on determining that the content received from the content server is associated with the broadcast identifier of the local network device, serving, via the local network device, the content via multicast transmission to the user equipment in the multicast SFN coverage area for presenting the content at the user equipment.

8. The computer-implemented method of claim 7, further comprising:
   receiving, at the local network device, content update information for the content from the content server;

requesting updated content from the content server based at least on the content update information, the updated content associated with the broadcast identifier of the local network device;

receiving the updated content from the content server at the local network device;

storing, at the local network device, the updated content received from the content server based at least on the caching logic;

determining whether the user equipment is a member of a multicast address group; and in response to determining that the user equipment is the member of the multicast address group, serving, via the local network device, the updated content via the multicast transmission to the user equipment in response to a triggering event.

9. The computer-implemented method of claim 8, wherein the content update information comprises a content identifier associated with the updated content.

10. The computer-implemented method of claim 9, receiving, at the local network device, an additional request for the updated content from an additional user equipment;

determining whether the updated content is stored at the additional user equipment; and in response to determining that the updated content is stored at the additional user equipment, sending, via the local network device, the content identifier associated with the updated content to present the updated content that is stored at the additional user equipment.

11. The computer-implemented method of claim 7, wherein the usage data includes at least one of clickstream data, search data, purchase data, and profile data associated with the user equipment.

12. The computer-implemented method of claim 7, wherein the local network device comprises a base station.

13. A system, comprising:

one or more non-transitory storage media of a local network device configured to provide stored computer-readable instructions, the one or more non-transitory storage mediums coupled to one or more processors, the one or more processors configured to execute the computer-readable instructions to cause the one or more processors to:

receive, at the local network device, a request for content from a user equipment in a multicast single frequency network (SFN) coverage area, the request comprising usage data associated with the user equipment indicating a triggering event;

determine whether the content is cached at the local network device;

in response to determining that the content is not cached at the local network device, determine, at the local network device, a broadcast identifier that identifies the local network device serving the user equipment and the SFN coverage area identify, via the local network device, a content server to provide the content based at least on the usage data and the broadcast identifier that identifies the local network device serving the user equipment and the SFN coverage area;

receive, at the local network device and from the content server, the content;

store, at the local network device, the content from the content server;

determine, at the local network device, that the content received from the content server is associated with the broadcast identifier of the local network device; and based on determining that the content received from the content server is associated with the broadcast identifier of the local network device, serve, via the local network device, the content via multicast transmission to the user equipment in the multicast SFN coverage area for presenting the content at the user equipment.

14. The system of claim 13, the one or more processors further configured to:

receive, at the local network device, content update information for the content from the content server;

request updated content from the content server based at least on the content update information, the updated content associated with the broadcast identifier of the local network device;

receive the updated content from the content server at the local network device;

store, at the local network device, the updated content received from the content server; and serve, via the local network device, the updated content via the multicast transmission to the user equipment in response to a triggering event.

15. The system of claim 14, wherein the content update information comprises a content identifier associated with the updated content.

16. The system of claim 15, the one or more processors further configured to:

receive, at the local network device, an additional request for the updated content from an additional user equipment;

determine whether the updated content is stored at the additional user equipment; and in response to determining that the updated content is stored at the additional user equipment, send, via the local network device, the content identifier associated with the updated content to present the updated content at the additional user equipment.

17. The system of claim 14, wherein the triggering event comprises time aligned breaks.

18. The system of claim 13, wherein the usage data includes at least one of clickstream data, search data, purchase data, and profile data associated with the user equipment.

19. The system of claim 13, wherein the user equipment is a member of a multicast address group.

20. The system of claim 13, wherein the local network device comprises a base station.

* * * * *